UNITED STATES PATENT OFFICE.

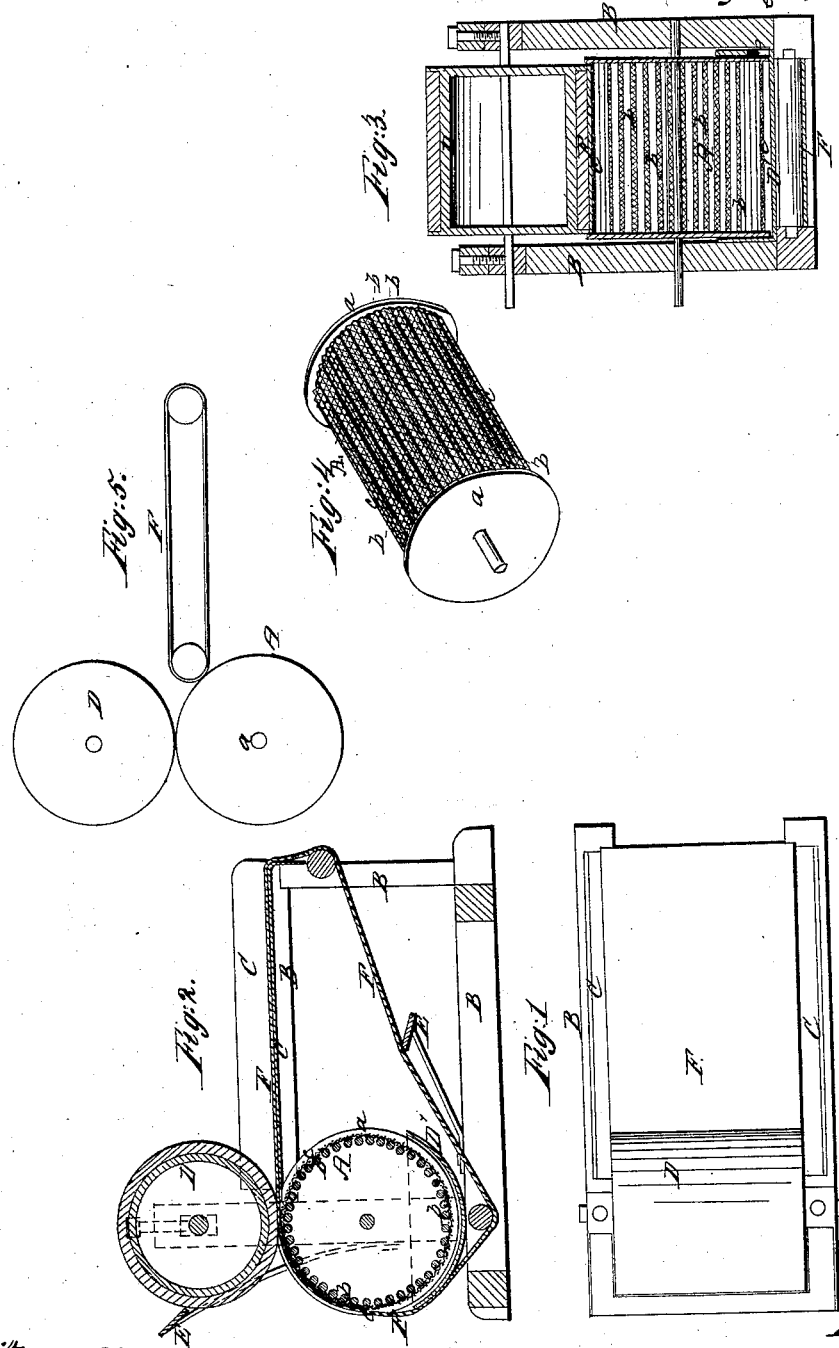

GEORGE S. RUST, OF CHESTER, ILLINOIS.

IMPROVEMENT IN EXPRESSING THE JUICE OF APPLES, GRAPES, &c.

Specification forming part of Letters Patent No. 35,896, dated July 15, 1862.

*To all whom it may concern:*

Be it known that I, GEORGE S. RUST, of Chester, in the county of Randolph and State of Illinois, have invented a new and useful Improvement in Rolls and Mechanism for Expressing and Separating Juices from Apples, Grapes, and other Juicy Substances; and I do hereby declare that the following is a full, clear, and exact description of the same, reference being had to the accompanying drawings, forming part of this specification, in which—

Figure 1 is a top view of the machine; Fig. 2, a longitudinal section of same, and Fig. 3 a transverse section of same; Fig. 4, a perspective view of the perforated roll; Fig. 5, a modification of the arrangement.

Similar letters of reference in the several figures indicate corresponding parts.

One of the leading difficulties with apple and grape expressing machines is that of the pomace or skins and seed, after the expressing operation has been performed, passing together from between the rolls into the receiver and their requiring to be separated by auxiliary means.

My invention is designed to obviate this difficulty; and to this end I have devised a roller, A, which is composed of strong solid heads *a a*, strong longitudinal bars *b b*, and a wire-gauze or perforated metal covering, *c*. The bars *b b* are placed between the heads at suitable distances apart, so as to form an open or grated cylinder, and the wire-gauze is fitted snugly around the circle of bars. Thus a strong hollow perforated expressing-roller, as a substitute for one of the ordinary solid expressing-rollers of apple or grape mills, is produced. This roller has a strong supporting-shaft or short journals, in order that it may revolve in a frame or mill the same as any solid roller. To use this roller for expressing apples, grapes, oily substances, &c., a frame, B, is provided, and on this frame a platform or hopper, C, is constructed. At the rear end of the platform, just level, or nearly so, with its upper surface, the roller A is arranged, and above said roller another roller, D, is set. This roller has its circumference covered with a flexible material, so that it mashes the substances from which juices are to be expressed, but does not break the seed contained therein.

Below the two rollers a juice-receiver, D', of concave form, is placed. This receiver is constructed with a discharge passage or spout, *e*, so that the juice may escape into a general receptacle.

Around the platform C, under the concave and between the rollers A D, an endless belt or apron, F, is arranged so as to revolve. This apron is made of coarse cloth, so that juices may be forced through it, but not the pomace of apples or seeds and skins of grapes along with them.

Below the endless apron a spring-scraper, E, is placed, so as to clear the apron of adhering substances as it revolves. A similar scraper, E', is placed against the rear of the roller D.

In Fig. 5 the rollers A and D are shown arranged and constructed as just described, but the endless belt is not passed between the rollers. This plan is intended particularly for pressing sugar-cane, and it will answer, as the stalks are not liable to pass through the perforations of the cylinder A, as in the cases of apple-pomace, grape-seeds, and oily substances.

The operation is as follows: The rollers being revolved by gearing, or as usual, the endless apron F feeds the substances between the rollers A D, and these rollers express the juice therefrom and force it through the meshes of the apron and through the perforations of the cylinder A into the cylinder, from which it flows into the concave, and therefrom to a general receptacle. While the juices are thus passing through the cylinder A, the pomace or seeds and skins are carried off by the apron and the upper roller, from which they are discharged by the scrapers. Thus the juices and foreign substances are separated during the expressing operation, and by the very means which are used for performing the expressing operation. The same result will be accomplished with the plan shown in Fig. 5 in the expressing of substances which have large stalks or hulls, and, in fact, if the expressing-cylinder A is finely reticulated, other substances—such as apples, grapes, flaxseed, &c.—might be operated upon by plan, Fig. 5, to good advantage. Still it is best to use the plan shown by Figs. 1, 2, 3, and 4 for apples, grapes, and flaxseed, in order to retain the fine particles which might pass through the cylinder with the juices or oils.

What I claim as my invention, and desire to secure by Letters Patent, is—

Expressing and separating juices, oils, and fluids from the substances which contain the same by employing in an organization, substantially as described, a pressing-cylinder whose periphery is perforated or constructed of open-work, and whose body is hollow, substantially as and for the purposes set forth.

Witness my hand and seal, in the matter of my application for a patent for an improved machine for grinding apples and expressing the juice therefrom, this 10th day of May, A. D. 1862.

G. S. RUST. [L. S.]

Witnesses:
GUSTAVUS DIETERICH,
EDWIN S. JACOB.